United States Patent [19]

Prough

[11] Patent Number: 5,236,286
[45] Date of Patent: Aug. 17, 1993

[54] HIGH PRESSURE FEEDER SPLIT OUTFLOW FOR ENHANCED FEEDER EFFICIENCY

[75] Inventor: James R. Prough, Glens Falls, N.Y.
[73] Assignee: Kamyr, Inc., Glens Falls, N.Y.
[21] Appl. No.: 868,347
[22] Filed: Apr. 15, 1992
[51] Int. Cl.$^5$ ............... B65G 53/30; B65G 53/40; B65G 53/46
[52] U.S. Cl. .................................. 406/52; 406/63; 406/105; 406/109
[58] Field of Search .................. 406/52, 62–64, 406/67, 105, 106, 109, 171, 172, 197

[56] References Cited

U.S. PATENT DOCUMENTS

| | | | |
|---|---|---|---|
| 3,950,146 | 4/1976 | Funk | 406/105 X |
| 4,017,270 | 4/1977 | Funk et al. | 406/63 X |
| 4,033,811 | 7/1977 | Gloersen | 406/62 X |
| 4,082,368 | 4/1978 | Funk | 406/105 |
| 4,187,043 | 2/1980 | Kindersley | 406/105 |
| 4,338,049 | 7/1982 | Richter et al. | 406/63 |
| 4,354,777 | 10/1982 | Richter et al. | 406/63 |
| 4,415,296 | 11/1983 | Funk | 406/19 |
| 4,416,567 | 11/1983 | Elmore et al. | 406/105 X |
| 4,430,029 | 2/1984 | Richter et al. | 406/63 |
| 4,516,887 | 5/1985 | Richter et al. | 406/63 |

FOREIGN PATENT DOCUMENTS

| | | | |
|---|---|---|---|
| 2629209 | 1/1978 | Fed. Rep. of Germany | 406/63 |
| 174094 | 1/1961 | Sweden | 406/109 |

*Primary Examiner*—David M. Mitchell
*Assistant Examiner*—James M. Kannofsky
*Attorney, Agent, or Firm*—Nixon & Vanderhye

[57] ABSTRACT

A high pressure transfer device for feeding wood chips to a digester in the production of paper pulp has enhanced efficiency. A rotor having first and second sets of through extending conduits is mounted for rotation in a housing having first through fourth ports associated with each set, with a screen at the third port of each set for screening wood chips out of liquid passing through that third port. The third port of each set is connected to its own distinct source of suction, so as to enhance filling efficiency of the rotor.

20 Claims, 4 Drawing Sheets

HIGH PRESSURE FEEDER SPLIT OUTFLOW FOR ENHANCED FEEDER EFFICIENCY

BACKGROUND AND SUMMARY OF THE INVENTION

The high pressure feeder, or transfer device, is one of the most basic and important components of the Kamyr continuous pulping system. The high pressure feeder is used to transfer steamed wood chips in a liquid (typically white liquor) at low pressure to the top of the continuous digester, at high pressure. A typical high pressure transfer device comprises a rotor having through extending pockets disposed in first and second sets spaced along the axis of rotation of the rotor a housing, a screen, and high and low pressure pumps. The rotor pockets each have opposite end openings which function as both inlets and outlets depending upon the angular position of the rotor, and the pockets of one set (typically two) are offset from those of the other. The housing encloses the rotor and has an exterior periphery with first through fourth ports for each set disposed around the exterior periphery for registry with the inlets to and outlets from the pockets. The first and third ports are opposite, and the second and fourth ports are opposite, and the first and second ports may be adjacent in the direction of rotation.

In a conventional high pressure feeder screen means are disposed in the third port of each set for screening particles above a predetermined size out of the liquid passing through the third port, and a single low pressure pump is connected to a single conduit from the third ports to provide the suction for sucking liquid through the third port. A high pressure pump is operatively connected to the second port to provide the flow of liquid under high pressure through the second port. Normally the first port is on the top, and the third port on the bottom, the first port connected to the chips chute, and the fourth port connected to the top of the digester.

While conventional high pressure feeders have functioned very well over the decades they have been in use, there have been relatively few substantive changes to the high pressure feeder over time. It has been known that the filling efficiency of the high pressure feeder is approximately 50 to 60% on some chip furnishers that is significantly lower than is desired, but to date no significant inroads have been made in substantially increasing that efficiency since the source of the lack of efficiency has not been understood.

To a large extent, the efficiency of the high pressure feeder is dictated by its ability to obtain the chip chute circulation which carries the chips from the chute into the pockets of the rotor. The chip chute circulation is throttled on the suction side of the chip chute circulation pump by the pressure drop across the screen at the third port.

According to the present invention, for the first time it is understood why this pressure drop occurs. After extensive testing, according to the invention it has been found that as the consecutive pockets open in the different sets of the rotor, as the chips and liquid are flowing into the most open (first opened) pocket because it is connected to the same suction source as the pocket in the other set that is just opening, there is little pressure to start flow into the second opening pocket. Thus, the second pocket will not really start to effectively fill until the first pocket has moved to a position where it is starting to significantly close. Thus the feeder suction is throttled. Therefore if the feeder is rotated faster, the time available to fill the feeder goes down, and thus the high pressure transfer device is forced to run at a lower filling efficiency than desired to get enough flow.

In addition to identifying the source of the relatively low high pressure transfer device efficiency, according to the present invention the problem has been solved by providing a distinct source of suction for the third pocket of each set to suck liquid through the screen means of that third port so as to enhance the filling efficiencies of the pockets at any given speed of rotation of the rotor. There are two presently contemplated major ways in which the separate suction sources can be provided. In a first way, first and second elongated conduits extend from the separate third ports (the third port associated with each set), and the conduits are connected to a common low pressure pump. In a second embodiment, the distinct elongated conduits are connected to separate pumps. When the conduits are connected to separate low pressure pumps, it may be necessary or desirable to provide a mechanism to prevent water hammer or pump cavitation. This may be provided by utilizing a cross connection having an orifice therein between the elongated conduits, just before the low pressure pumps.

The invention also contemplates a method of transferring wood chips in liquid through the high pressure transfer device to boost the flow rate thereof. That method includes the conventional steps for feeding wood chips utilizing a high pressure transfer device, but in which suction is supplied separately to the third port of each set, so as to enhance the filling efficiency of the pockets for a given speed of rotation. This may be accomplished by connecting the third ports through elongated conduits to a single pump, or to separate low pressure pumps, with a water hammer preventing connection therebetween, as described above.

It is the primary object of the present invention to provide for enhanced efficiency of a conventional high pressure transfer device, particularly for use in a method of boosting the flow rate of a slurry of wood chips. This and other objects of the invention will become clear from an inspection of the detailed description of the invention, and from the appended claims.

DETAILED DESCRIPTION OF THE DRAWINGS

Figure 2:
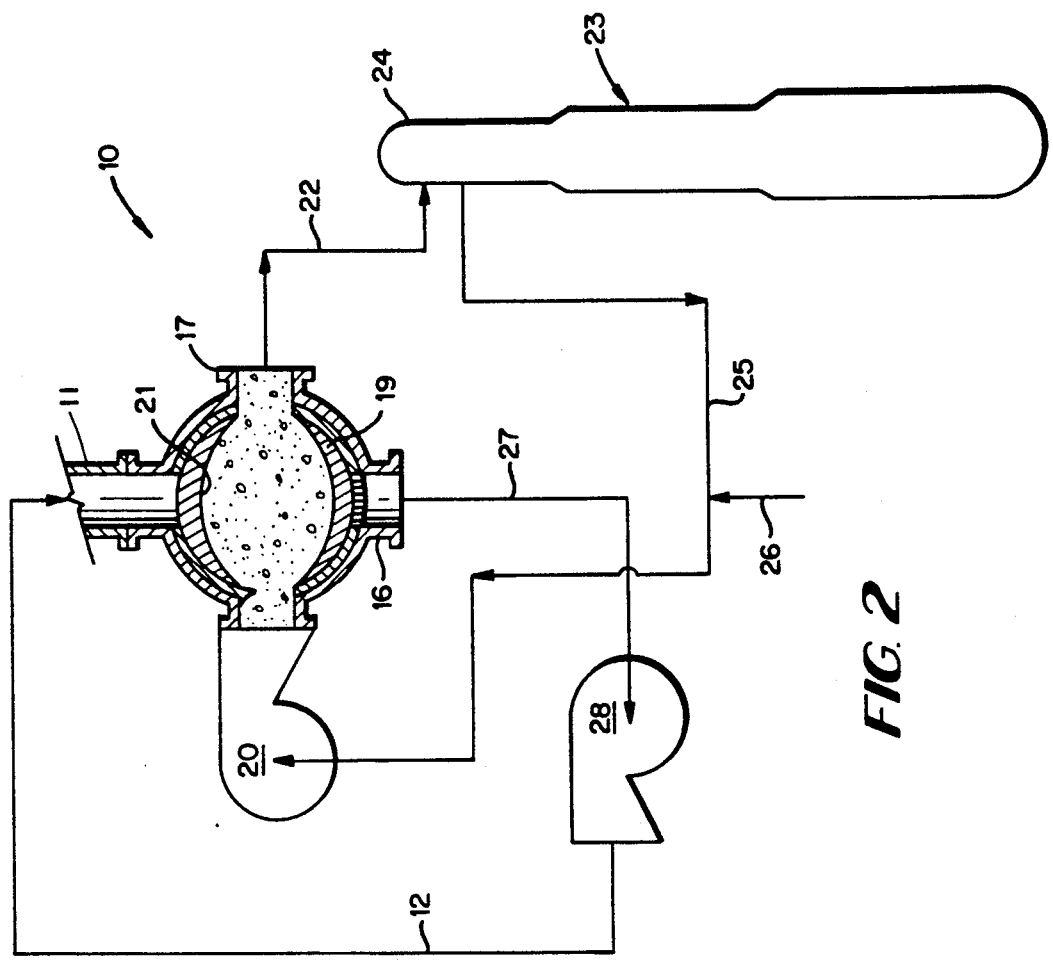
FIG. 2 is a view like that of FIG. 1 only showing ideal emptying of the pocket, and illustrating the high pressure feeder connected to the top of a continuous digester.
Figure 1:
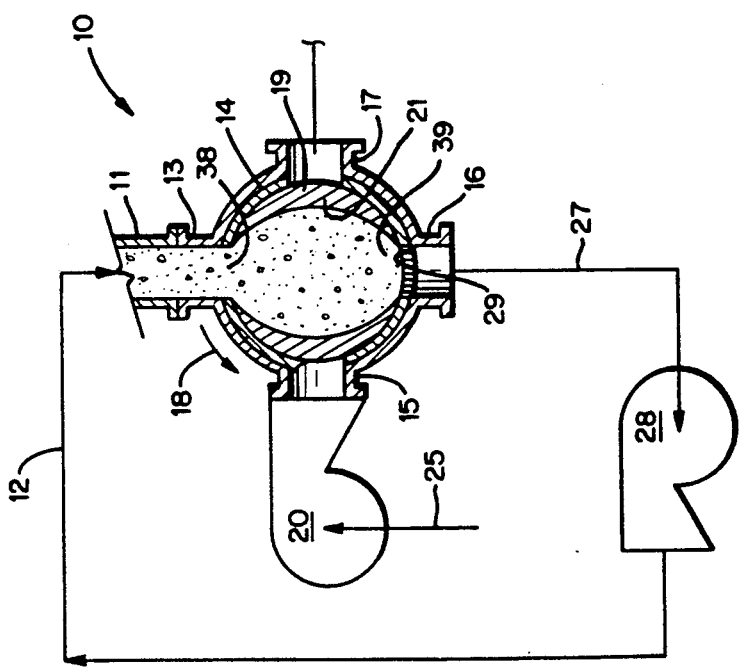
FIG. 1 is a side schematic view illustrating ideal filling of a high pressure feeder pocket.

FIGS. 1 and 2 schematically illustrate the operation of a high pressure transfer device, shown generally by reference numeral 10, according to the present invention. As is conventional, the device 10 is connected to a chip chute 11, which is supplied with steamed chips from a conventional steaming vessel, the chips being slurried with liquid from line 12. The chute 11 is connected up to a first port 13 of a housing 14. The housing 14 also has a second port 15, a third port 16, and a fourth port 17, disposed at approximately 90° intervals in the direction of rotation 18 (the direction of rotation is not particularly important and could either be in the direction 18, or opposite thereto) of a pocketed, tapered, rotor 19 disposed within the housing 14. The rotor 19 has first and second sets of through extending pockets (see FIG. 4), and the housing has a port (or port segment) associated with each set.

Connected up to the second port 15 is means for supplying high pressure liquid, typically the high pressure pump 20. As illustrated in FIG. 2, the pump 20 provides liquid under high pressure so that when the port 15 is in communication with a pocket 21 within the rotor 19 the chips or like cellulosic fibrous material within the pocket 21 are flushed out the fourth port 17 into the top circulation line 22 associated with a conventional continuous digester 23. The line 22 feeds the chips in liquid under pressure to the top 24 of the digester 23. At the top 24 a conventional solids/liquid separator is provided, which returns some of the liquid slurrying the chips in the line 22, via the conduit 25, which is ultimately connected to the inlet to the pump 20. The liquid in lines 22, 25 typically is white liquor, which includes steam condensate and sometimes black liquor, and which may be supplemented from the make up line 26. For non-kraft situations, the liquid in lines 22, 25 could be water, solvent pulping liquid, etc.

Connected to the third port 16, and providing a suction thereto, is a line 27 connected to a low pressure pump 28, the pump 28 in turn being connected to the line 12 to supply slurrying liquid to the chip chute 11. Mounted within the housing 14 at the third port 16 of each set is a screen, one of the two screens shown generally by reference numeral 29. As seen in FIG. 1, the screens 29 allow liquid to pass into the conduit 27 under the influence of the suction of pump 28, while the chips or like cellulosic fibrous material cannot pass through the screen 29 and, therefore, remain in pocket 21 in rotor 19. In a conventional device 10 a single line 27 and single pump 28 are provided, supplying suction to both sets of pockets of the rotor 19.

Figure 4:
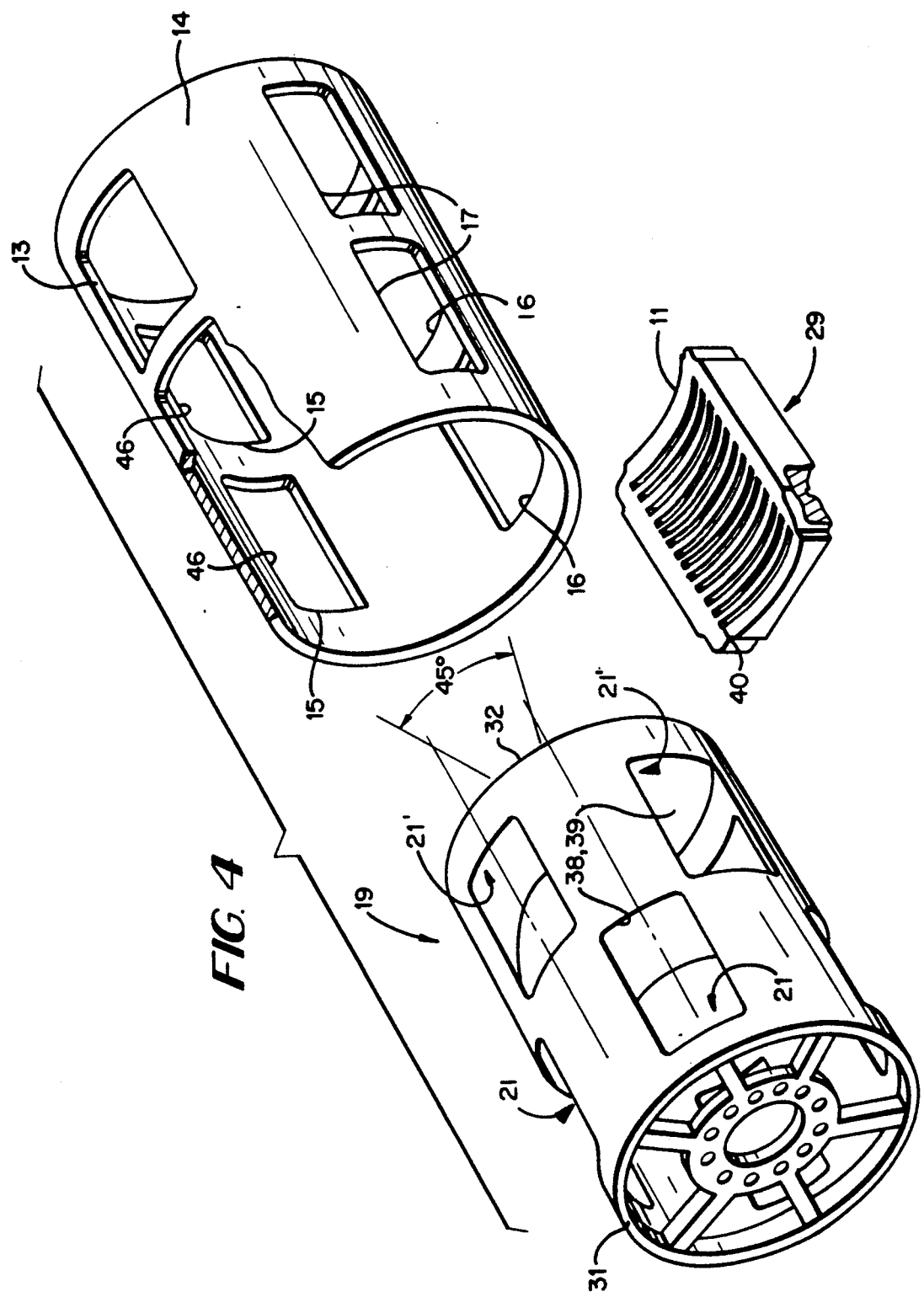
FIG. 4 is an exploded perspective view illustrating certain parts of the feeder of FIG. 3.

FIG. 4 illustrates the rotor 19, which is tapered from a first end 31 thereof to the second end 32. The rotor 31 includes a plurality of (e.g. four) diametrically through-going pockets 21, 21'. Typically two pockets 21 are disposed in a first set, and two pockets 21' in a second set, the sets spaced along the axis of rotation, and the pockets of one set are offset with respect to the pockets of the other.

Figure 3:
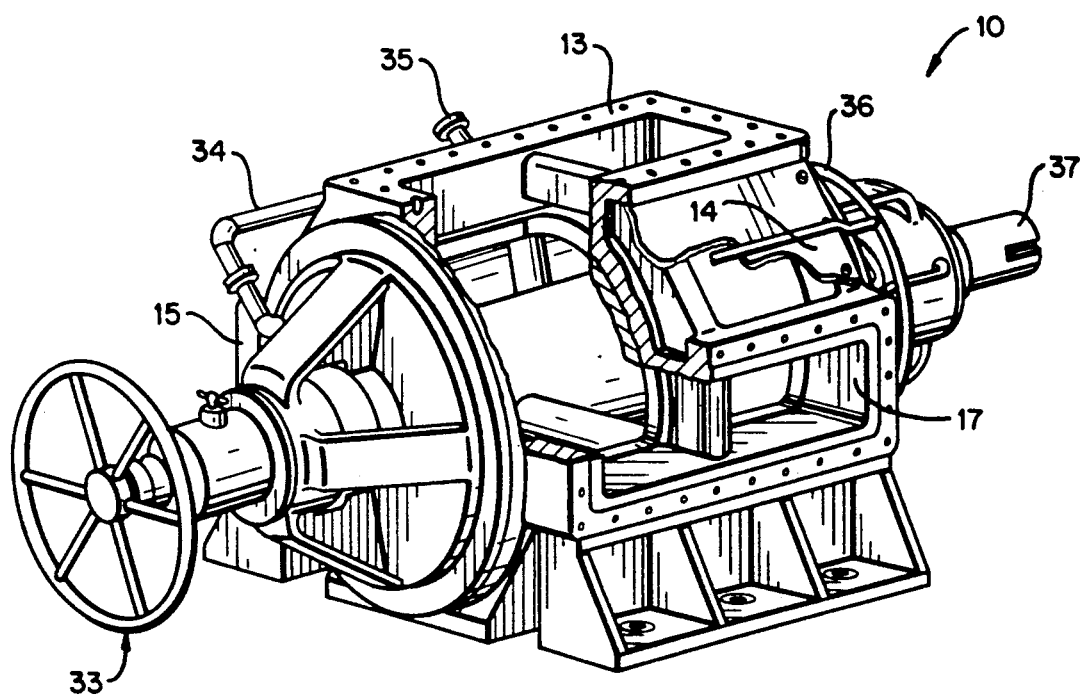
FIG. 3 is a perspective view of a conventional high pressure feeder.

As seen in FIG. 3, a plug clearance adjustment mechanism 33 can be provided for adjusting the tapered rotor 19 within the housing 14, and the housing 14 may be provided with a plurality of other conventional components such as a bell housing equalization line 34, a white liquor purge connection 35, a preheat header 36, and a shaft 37—connected to a power source for rotating the rotor 19 and to the rotor itself.

What has heretofore been described is conventional for a Kamyr high pressure feed, such as shown in U.S. Pat. No. 4,187,043. However, according to the invention various changes are made to the feeder 10 so as to improve the efficiency of the pocket filling operations.

Figure 5:
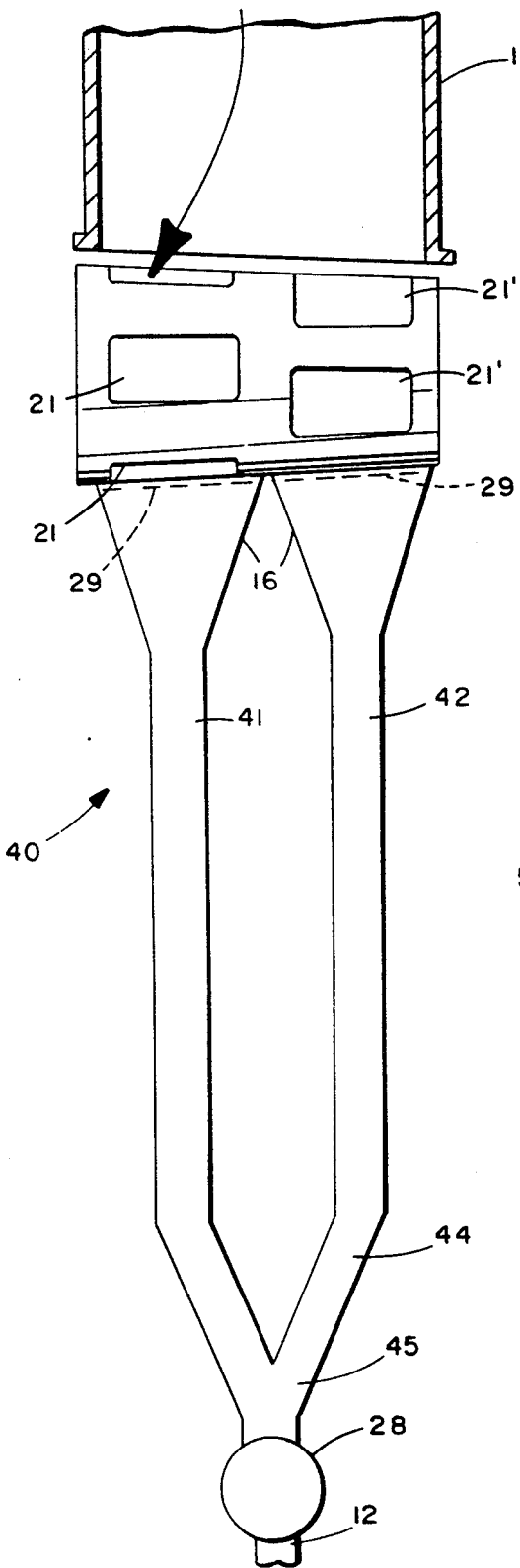
FIG. 5 is a schematic side view, partly in cross-section and partly in elevation, showing a first embodiment of a mechanism for distinctly separating the suction sources to the two sets of pockets of the rotor, in accordance with the invention.

As illustrated in FIG. 5, means 40 provide a distinct suction source 44 for the third port of each set of pockets 21, 21' so that liquid is sucked through the screen means 29, when a pocket 21, 21' is rotated into operative association with the third port 16 of each set, so as to enhance filling efficiencies of the pockets 21, 21' at any given speed of rotation of the rotor 19. In the embodiment illustrated in FIG. 5 the means for providing distinct suction sources comprises first and second elongated conduits 41, 42, which are separately connected to the port (or port segment) 16 at one end thereof. For the specific embodiment of FIG. 5, the opposite ends of the conduits 41, 42 are provided as connectors 44 which join in a common connection 45 which in turn is connected to a single low pressure pump 28 having an outlet conduit 12 therefrom.

Figure 6:
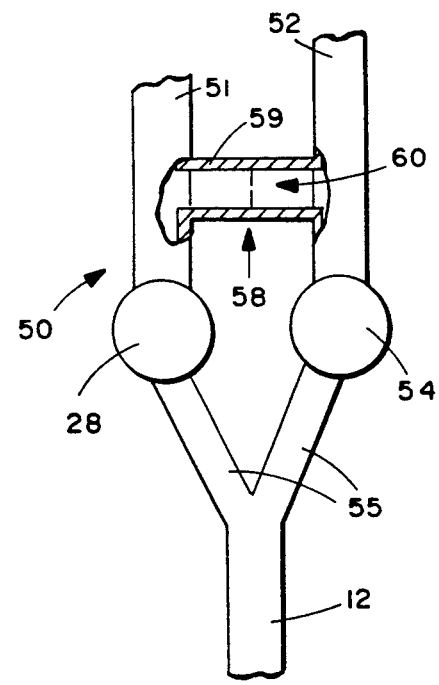
FIG. 6 is a second embodiment of the suction source separation means according to the invention.

FIG. 6 illustrates a different embodiment 50 of means for providing a distinct suction source for each of the ports 16. In the FIG. 6 embodiment, elongated conduits 51, 52 are connected at the tops thereof to the port 16 just as in the FIG. 5 embodiment, but at the bottoms thereof are connected to two different low pressure pumps, 28 and 54. In the embodiment illustrated in FIG. 6, the discharge conduits 55 from the pumps 28, 54 merge in the common conduit 12 which recirculates the withdrawn liquid to the chip chute 11. In this embodiment, there is the possibility that there could be cavitation of the pump or water hammer if a conduit 51, 52 goes essentially dry during the rotation of the rotor 19 to a position where a pocket 21 or 21' does not communicate with a pump 28, 54 for a particular length of time. In order to avoid that possibility the means 58 are provided, which preferably may comprise a cross-conduit 59 connected between the elongated conduits 51, 52, preferably just above the pumps 28, 54, with an orifice 60 in the conduit 59. In this way, if a pocket 21 is in communication with the conduit 51, liquid is pumped therethrough by the pump 48, but the conduit 52 is blocked off from communication with a pocket 21' and—if it starts to become dry —enough liquid will flow from conduit 51 through the orifice 60 to the pump 54 to prevent cavitation or water hammer.

Utilizing the invention, there always will be a substantial force on the slurried chips tending to pull them into an open pocket 21, 21', even if the pocket has just started to open. Thus the rotor 19 can be rotated at a higher speed than conventional and still have acceptable filling efficiency, or if rotated at conventional speed will have a higher filling efficiency.

While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent structures and procedures.

What is claimed is:

1. A high pressure transfer device for transferring a slurry containing particles, a vast majority of which are above a first size, said device comprising:

(a) a pocketed rotor containing a plurality of through going pockets, said rotor rotatable about a given axis of rotation and said pockets having opposite end openings which function as both inlets and outlets depending upon the angular position of the rotor and said pockets are provided in at least first and second sets, with the pockets in each set offset from the pockets in the at least one other set;

(b) a housing enclosing said rotor, said housing having an exterior periphery and first through fourth ports disposed around the exterior periphery thereof for registry with the inlets and outlets from said through going pockets, for each set; for each set said first port being opposite said third port, and said second port opposite said fourth port;

(c) means for mounting said rotor in said housing for rotation with respect to said ports about said given axis of rotation, and in a first direction;

(d) screen means disposed in said third port of each set, for screening particles above said size out of the liquid passing through said third port;

(e) means for providing respective distinct suction sources to a respective to said third port of each set to suck liquid through said screen means when one of said pockets is rotated into operative association with said third port of that set, so as to enhance filling efficiencies of said pockets at any given speed of rotation of said rotor; and (f) a high pressure pump connected to said second ports.

2. A device as recited in claim 1 wherein said means for providing comprises respective elongated conduits extending one from each of said third ports, and connected to a common pump.

3. A device as recited in claim 2 wherein said pocket sets consist of said first and second sets.

4. A device as recited in claim 2 wherein each set comprises two through extending pockets.

5. A device as recited in claim 4 wherein said pocket sets consist of said first and second sets.

6. A device as recited in claim 1 wherein said means for providing comprises respective elongated conduits and respective distinct pumps connected to each of said third ports.

7. A device as recited in claim 6 wherein said pocket sets consist of said first and second sets.

8. A device as recited in claim 6 wherein each set comprises two through extending pockets.

9. A device as recited in claim 8 wherein said pocket sets consist of said first and second sets.

10. A device as recited in claim 6 further comprising a connection between said elongated conduits to prevent water hammer and pump cavitation.

11. A device as recited in claim 10 wherein said elongated conduits are parallel, and wherein said connection comprises an orifice in a cross conduit between said elongated conduits.

12. A device as recited in claim 10 further comprising a common discharge conduit from said distinct pumps, said common discharge conduit connected to the second port of all of said at least first and second sets.

13. A method of transferring wood chips in liquid through a transfer device to boost the flow rate thereof, a vast majority of said wood chips being greater than, a first size, using said transfer device which has a housing with first an second sets of first through fourth ports approximately equally spaced around the circumference thereof, the first and third ports of each set being opposite, and the second and fourth ports of each set being opposite, the ports extending in sequence in a first direction of rotation, and a rotor mounted in the housing for rotation in the first direction about an axis, and having diametrically through extending pockets, disposed in first and second sets corresponding to said first and second sets of said ports, with opposite open ends of said pockets serving as a pocket inlet or outlet depending upon an arcuate position of the rotor, said method comprising the steps of continuously:

(a) rotating the rotor in the first direction about its axis of rotation;

(b) feeding said chips in liquid to the first port of each set;

(c) applying suction to the third port of each set;

(d) screening the liquid passing from one of said pockets through the third port of its corresponding set of ports to remove chips of greater size than said first size from the liquid so that the chips remain in the pocket and do not pass through the third port; and (e) supplying liquid under high pressure to the second port, so that when said pocket is in communication with the second and fourth ports of its corresponding set of ports the high pressure liquid forces the chips in the pocket out of the pocket and through the fourth port; and wherein step (c is practiced by supplying respective separate sources of suction to a respective said third port of each set, so as to enhance the filling efficiency of the pockets for a given speed of rotation.

14. A method as recited in claim 13 wherein step (c) is further practiced by connecting the third port of each set to respective separate elongated conduits connected to a common pump.

15. A method as recited in claim 13 wherein step (c) is further practiced by connecting the third port of each set to respective distinct elongated conduits with there own respective distinct pumps.

16. A method as recited in claim 15 comprising the further step of connecting the elongated conduits together to prevent water hammer and pump cavitation.

17. A method as recited in claim 16 wherein said conduit connection step is practiced by providing a cross conduit with an orifice therein between the elongated conduits.

18. A high pressure transfer device comprising a pocketed rotor containing four through going pockets disposed in a first set and four through going pockets in a second set, and rotatable about an axis;

a housing enclosing said rotor, said housing having an exterior periphery and first through fourth ports disposed around the exterior periphery for registry with the pockets of each set;

means for mounting said rotor in said housing for rotation with respect to said ports about said given axis of rotation;

a screen disposed in said third port of each set; and a first elongated conduit extending from said third port of said first set, and a second elongated conduit from said first conduit, extending from said third port of said second set, said elongated conduits ultimately being connected to said first ports of said housing.

19. A device as recited in claim 18 wherein said first and second elongated conduits are connected to a common pump.

20. A device as recited in claim 18 wherein said first and second elongated conduits are each connected to respective separate pumps, and further comprising a connection between said elongated conduits to prevent water hammer and cavitation of said pumps.

* * * * *